(12) United States Patent
Meganathan et al.

(10) Patent No.: US 10,855,728 B2
(45) Date of Patent: Dec. 1, 2020

(54) SYSTEMS AND METHODS FOR DIRECTLY ACCESSING VIDEO DATA STREAMS AND DATA BETWEEN DEVICES IN A VIDEO SURVEILLANCE SYSTEM

(71) Applicant: Honeywell International Inc., Morristown, NJ (US)

(72) Inventors: Deepak Sundar Meganathan, Bangalore (IN); Avijit Saha, Bangalore (IN); Venugopala Reddy Janga, Bangalore (IN)

(73) Assignee: HONEYWELL INTERNATIONAL INC, Morristown, NJ (US)

( * ) Notice: Subject to any disclaimer, the term of this patent is extended or adjusted under 35 U.S.C. 154(b) by 166 days.

(21) Appl. No.: 15/720,075

(22) Filed: Sep. 29, 2017

(65) Prior Publication Data

US 2019/0104161 A1    Apr. 4, 2019

(51) Int. Cl.
```
G06K 9/00     (2006.01)
H04L 29/06    (2006.01)
H04N 7/18     (2006.01)
G06K 7/10     (2006.01)
G06K 7/14     (2006.01)
G06K 9/32     (2006.01)
G06K 19/06    (2006.01)
H04L 29/08    (2006.01)
```

(52) U.S. Cl.
CPC ...... *H04L 65/1069* (2013.01); *G06K 7/10722* (2013.01); *G06K 7/1417* (2013.01); *G06K 9/00711* (2013.01); *G06K 9/00744* (2013.01); *G06K 9/00771* (2013.01); *G06K 9/3233* (2013.01); *G06K 19/06037* (2013.01); *H04N 7/181* (2013.01); *H04N 7/185* (2013.01); *H04N 7/188* (2013.01); *G06K 9/00758* (2013.01); *H04L 67/10* (2013.01)

(58) Field of Classification Search
CPC .......... G06K 9/00711; G06K 9/00758; G06K 9/00362; G06K 9/00744; G06K 9/00771; H04N 7/181
See application file for complete search history.

(56) References Cited

U.S. PATENT DOCUMENTS

| | | |
|---|---|---|
| 8,368,754 B2 | 2/2013 | Flores et al. |
| 8,750,677 B2 | 6/2014 | Brown et al. |
| 8,862,888 B2 | 10/2014 | Tolba et al. |
| 9,185,462 B2 | 11/2015 | Das et al. |

(Continued)

OTHER PUBLICATIONS

Extended European Search Report, EP Application 15154125.5, pp. 7, dated Jan. 29, 2019.

(Continued)

*Primary Examiner* — Jeong S Park
(74) *Attorney, Agent, or Firm* — Seager Tufte & Wickhem LLP

(57) ABSTRACT

Systems and methods for directly accessing video data streams and data between devices in a video surveillance system can include a first camera of a mobile device capturing an image of a field of view of a video data stream displayed on a second device, the mobile device matching the field of view with a source of the video data stream, and responsive to matching the field of view with the source, the mobile device retrieving the video data stream directly from the source.

15 Claims, 1 Drawing Sheet

(56) References Cited

U.S. PATENT DOCUMENTS

| | | | |
|---|---|---|---|
| 9,374,365 B2 | 6/2016 | Jiang et al. | |
| 2007/0019077 A1* | 1/2007 | Park | G08B 13/19695 348/211.99 |
| 2009/0083275 A1* | 3/2009 | Jacob | G06F 16/29 |
| 2011/0296459 A1* | 12/2011 | Medina | H04N 5/232 725/37 |
| 2014/0003656 A1* | 1/2014 | Lin | H04N 21/21805 382/103 |
| 2014/0362230 A1* | 12/2014 | Bulan | G06K 9/3241 348/169 |
| 2015/0271098 A1* | 9/2015 | Somadder | H04L 63/00 709/225 |
| 2015/0296180 A1* | 10/2015 | Shi | H04N 7/15 348/14.1 |
| 2016/0182929 A1* | 6/2016 | Ortiz | H04N 21/4331 725/25 |
| 2016/0182940 A1* | 6/2016 | Assayag | H04N 21/6181 725/62 |

OTHER PUBLICATIONS

Chris Edwards, 708Media, How to Create a QR That Opens Mobile Video, Mar. 28, 2011, http://www.708media.com/qrcode/how-to-create-qr-code-opens-mobile-video.

QuickeR: Using video QR codes to transfer data, stephendnicholas.com, Oct. 3, 2011, http://stephendnicholas.com/posts/quicker-video-qr-codes.

720P HD Wireless WiFi Video Monitoring Camera with Easy QR Code Setup, Zmodo Surveillance, Copyright © 2014, http://surveillance.zmodo.com/wifi-5.html.

Chellappa et al., University of Maryland, Pattern Recognition in Video, downloaded Dec. 16, 2016.

* cited by examiner

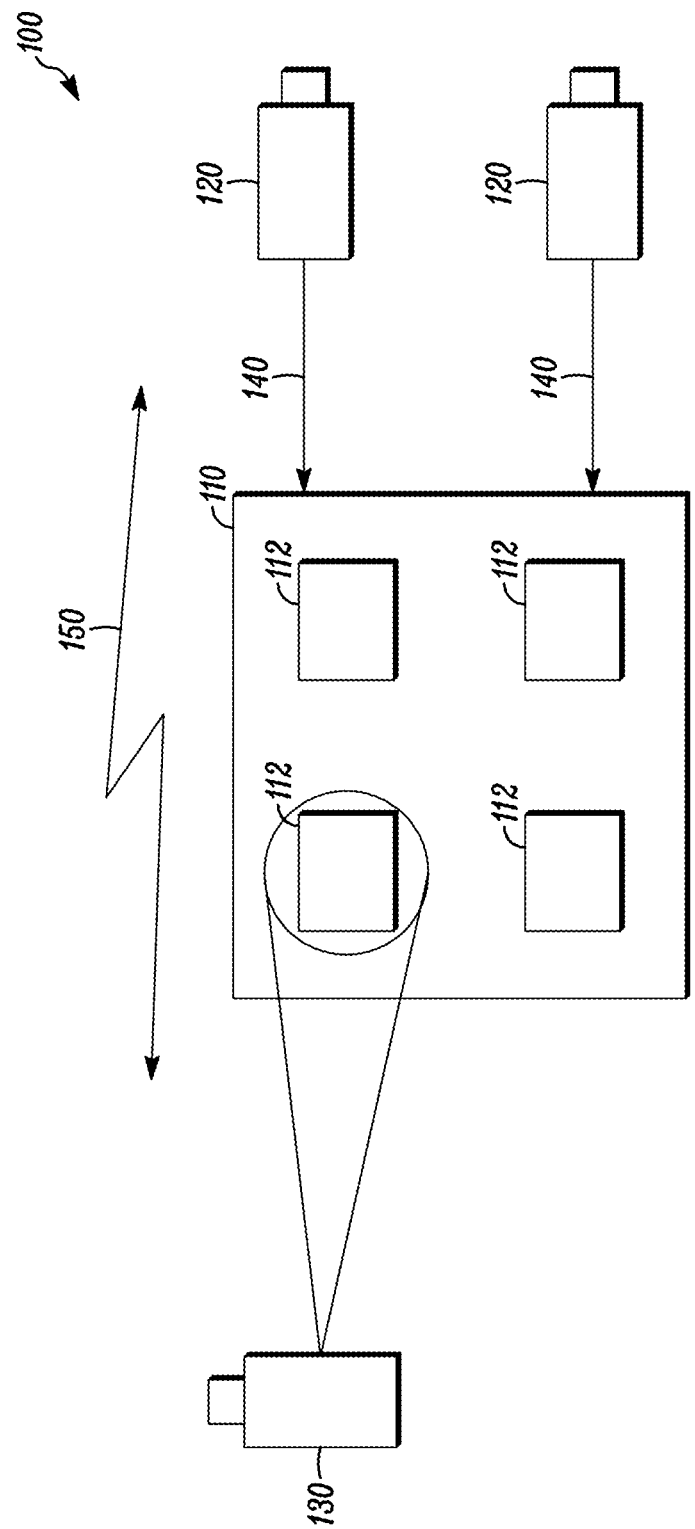

SYSTEMS AND METHODS FOR DIRECTLY ACCESSING VIDEO DATA STREAMS AND DATA BETWEEN DEVICES IN A VIDEO SURVEILLANCE SYSTEM

FIELD

The present invention relates to video surveillance systems. More particularly, the present invention relates to systems and methods for directly accessing video data streams and data between devices in a video surveillance system.

BACKGROUND

To access video data streams and data between devices in a video surveillance system, known systems and methods require formal launching, such as entering a user name, a password, and the details of one the devices, including an IP address and the like. However, such formal launching can consume a considerable amount of time, which can be undesirable when a user wants to access the video data streams or the data immediately.

For example, when the user views an object of interest displayed on a monitoring station that he wants to track personally, the user can move from the monitoring station to a target location and may want to view the video data streams of or the data related to the object of interest as he moves. While known systems and methods facilitate the user viewing the video data streams and the data on his mobile device, such known systems and methods require the above-identified formal launch and, therefore, consume a considerable amount of time to present the same view of the video data streams or the data displayed on the monitoring station on the user's mobile device. During this time, the user may lose track of the object of interest.

Furthermore, while the user is moving from the monitoring station to the target location, the user may want to share the view of the video data streams and the data displayed on the monitoring station to an on-site guard or a supervisor. However, to do so, known systems and methods require the above-identified formal launch to assign the view to the on-site guard or the supervisor.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for directly accessing video data streams and data between devices in a video surveillance system. For example, a mobile device can scan a field of view of a video data stream displayed on a second device, such as a monitoring station, match the field of view with a source of the video data stream, and, responsive to the matching, directly and instantly retrieve the video data stream from the source. That is, the mobile device need not receive the video data stream via the second device and need not provide any details of the source other than the field of view thereof to receive the video data stream therefrom.

It is to be understood that the mobile device disclosed herein can include a cellular phone, a smart phone, or a tablet device. However, it is to be understood that the mobile device disclosed herein can also include a wearable device, such as goggles, that includes a camera and a display unit or a projector.

In some embodiments, the mobile device can learn how to match the field of view of the video data stream displayed on the second device with the source of the video data stream by capturing and saving the field of view as a camera marker for the source. Accordingly, whenever the mobile device scans the field of view of the video data stream displayed on the second device, the mobile device can identify the source and retrieve the video data stream directly therefrom.

In some embodiments, a camera of the mobile device can capture and save a plurality of fields of view of the video data stream from the same source so that the mobile device can match one of the plurality of fields of view or an average of the plurality of fields of view with the source. For example, each of the plurality of fields of view can be different such that a first of the plurality of fields of view can contain activity or be illuminated, a second of the plurality of fields of view can contain no activity or be dark, and the like. In these embodiments, the mobile device can save each of the plurality of fields of view as a respective one of a plurality of camera markers for the source and/or the average of the plurality of fields of view as the camera marker for the source. Accordingly, in some embodiments, the mobile device can match the field of view displayed on the second device with one of the plurality of fields of view saved or with the average of the plurality of fields of view.

In use, when a user views an object of interest displayed on the second device that he wants to track by physically moving from the second device to a target location or that he wants to share with a remotely located supervisor, the user can focus the camera of his mobile device on a display screen of the second device to capture the field of view of the video data stream from a source of interest displayed thereon, for example, the source that is capturing the object of interest. In some embodiments, the source of interest can include a single camera or a plurality of cameras. Then, the mobile device can compare the field of view with a plurality of camera markers stored in memory, match the field of view with at least one of the plurality of camera markers, match the at least one of the plurality of camera markers with the source of interest, and retrieve the video data stream directly from source of interest for displaying on the mobile device as the user moves toward the target location to track the object of interest or as the user visits his remotely located supervisor. In some embodiments, retrieving the video data stream directly from the source of interest can include retrieving the video data stream directly from a camera, directly from a server device or a recording device to which the camera transmits the video data stream, or directly from a cloud server or a cloud server based application.

In some embodiments, the mobile device can transfer the video data stream being displayed thereon to a third device, such as a workstation of the remotely located supervisor. For example, a QR code that is specific to the third device can be virtually or physically displayed on the third device, for example, as a physical sticker on hardware of the third device or as a graphical icon on a display screen of the third device. The camera of the mobile device can capture the QR code, and the mobile device can match the QR code to the third device and, responsive to the matching, directly transmit the video data stream to the third device. That is, the mobile device need not transmit the video data stream to the third device via the second device and need not provide any details of the source or the second device to transmit the video data stream to the third device.

FIG. 1 is a block diagram of a system 100 in accordance with disclosed embodiments. As seen in FIG. 1, the system 100 can include a monitoring station 110 displaying fields of view 112 of a plurality of video data streams received from a plurality of cameras 120 via a first communication path 140. A camera of a mobile device 130 can capture an image of one of the fields of view 112. The mobile device 130 can match the one of the fields of view 112 with one of the plurality of cameras 120 that provided one of the plurality of video data streams of the one of the fields of view 112 and, responsive thereto, directly retrieve the one of the plurality of video data streams from the one of the plurality of cameras 120 via a second communication path 150 that is different than the first communication path 140.

Systems and methods are described herein in connection with a video surveillance system. However, it is to be understood that systems and methods are not so limited and can be used in connection with any security system, intrusion system, or connected or integrated system that includes IoT devices. For example, in addition to or as an alternative to the mobile device retrieving the video data stream directly from the source, the mobile device can directly retrieve any relevant data, including text, directly from an IoT device that can be matched to the field of view of or containing the IoT device that is displayed on the second device.

It is to be understood that each of the mobile device, the second device, the third device, the cloud server, and the source, such as the camera, disclosed herein can include a respective transceiver device, a respective memory device, and a respective user interface device each of which can be in communication with respective control circuitry, a respective programmable processor, and respective executable control software as would be understood by one of ordinary skill in the art. The respective executable control software can be stored on a transitory or non-transitory computer readable medium, including, but not limited to local computer memory, RAM, optical storage media, magnetic storage media, flash memory, and the like. In some embodiments, the respective control circuitry, the respective programmable processor, and the respective executable control software can execute and control some or all of the methods disclosed herein. For example, in some embodiments, the respective control circuitry, the respective programmable processor, and the respective executable control software of the mobile device can be embodied as a mobile application that can execute and control some or all of the methods disclosed herein.

Finally, it is to be understood that systems and methods disclosed herein can operate in an offline mode or an online mode. In the offline mode, the plurality of camera markers and the mobile application can be stored in the memory device of the mobile device, and the executable control software of the mobile device can execute and control the methods disclosed herein. However, in the online mode, the plurality of camera markers and the mobile application can be stored in the memory device of the cloud server, which can be accessed by the mobile device, and the executable control software of the cloud server can execute and control the methods disclosed herein.

Although a few embodiments have been described in detail above, other modifications are possible. For example, the logic flows described above do not require the particular order described or sequential order to achieve desirable results. Other steps may be provided, steps may be eliminated from the described flows, and other compohents may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    a first camera of a mobile device capturing an image of a field of view of each of a plurality of video data streams displayed on a monitoring station of a surveillance system, wherein the plurality of the video data streams are provided by a plurality of corresponding video cameras of the surveillance system, and wherein the field of view of each of the plurality of video data streams corresponds to the field of view of the corresponding video camera, and wherein the field of view of each of the plurality of video cameras is pre-defined and unique;
    storing the captured images of the field of views of each of the plurality of video data streams on the mobile device, such that each captured image of the field of view functions as a camera marker for the corresponding video camera in order to subsequently identify the corresponding video camera from its field of view;
    subsequently capturing an image of a field of view of a selected one of the plurality of video data streams displayed on the monitoring station;
    the mobile device matching the field of view of the subsequently captured image with one of the field of views of the captured images stored on the mobile device to identify the video camera that corresponds to the field of view of the selected one of the plurality of video data streams; and
    responsive to identifying the video camera that corresponds to the field of view of the selected one of the plurality of video data streams displayed on the monitoring station, the mobile device displaying the video data stream that corresponds to the identified video camera on the mobile device.

2. The method of claim 1 further comprising:
    the mobile device saving an average of a plurality of capture images of the field of view of the video data stream from a selected video camera, such that the average of the plurality of capture images of the field of view from the selected video camera functions as a camera marker for the selected video camera; and
    the mobile device matching the field of view of the subsequently captured image with the average of the plurality of capture images of the field of view from the selected video camera.

3. The method of claim 1 wherein the mobile device retrieves the video data stream directly from a source, wherein the source comprises one of the corresponding video camera, a server device or a recording device to which the corresponding camera transmits the video data stream, or from a cloud server or a cloud server based application.

4. The method of claim 1 further comprising:
the first camera of the mobile device further capturing a QR code;
the mobile device matching the QR code with a third device; and
responsive to matching the QR code, displaying the selected one of the plurality of video data streams on the third device.

5. The method of claim 1 wherein a source transmits the corresponding video data stream to the monitoring station via a first communication path, wherein the source transmits the video data stream to the mobile device via a second communication path, and wherein the first communication path is different than the second communication path.

6. A mobile device comprising:
a transceiver device;
a first camera;
a user interface device;
a programmable processor; and
executable control software stored on a non-transitory computer readable medium,
wherein the programmable processor and the executable control software are configured to use the first camera to capture an image of a field of view of each of a plurality of video data streams displayed on a monitoring station of a surveillance system, wherein each of the plurality of video data streams is provided by a corresponding video camera of the surveillance system,
wherein the programmable processor and the executable control software are configured to save a field of view for each of the corresponding video cameras, such that each field of view functions as a camera marker for identifying the corresponding video camera;
wherein the programmable processor and the executable control software are configured to subsequently capture an image of a field of view of a selected one of the plurality of video data streams displayed on the monitoring station, and match the field of view of the subsequently captured image with a corresponding video camera using the camera markers; and
wherein, responsive to matching the field of view of the subsequently captured image with the corresponding video camera, the programmable processor and the executable control software are configured to display the video data stream from the corresponding video camera on the mobile device.

7. The system of claim 6 wherein the programmable processor and the executable control software save an average of a plurality of fields of view as a camera marker for each video camera, and wherein the programmable processor and the executable control software match the field of view of the subsequently captured image with the average of the plurality of fields of view.

8. The system of claim 6 wherein the programmable processor and the executable control software match the field of view of the subsequently captured image with a corresponding video camera using the camera markers by comparing the field of view with the plurality of camera markers, matching the field of view of the subsequently captured image with one of the plurality of camera markers, and matching the one of the plurality of camera markers with the corresponding video camera.

9. The system of claim 6 wherein the programmable processor and the executable control software are configured to retrieve the video data stream directly from the corresponding video camera, from a server device or a recording device to which the corresponding video camera transmits the video data stream, or from a cloud server or a cloud server based application.

10. The system of claim 6 wherein the first camera of the mobile device captures a QR code, wherein the mobile device matches the QR code with a third device, and wherein, responsive to matching the QR code, displaying the video data stream from the corresponding video camera on the third device.

11. The system of claim 6 wherein the corresponding video camera transmits the video data stream to the monitoring station via a first communication path, wherein the corresponding video camera transmits the video data stream to the mobile device via a second communication path, and wherein the first communication path is different than the second communication path.

12. A method of directly accessing a video data stream that is displayed on a monitoring station and displaying the video data stream on a mobile device, the method comprising:
creating a static database of predefined camera markers by using a camera of the mobile device to capture a field of view of each of a plurality of video data streams displayed on the monitoring station, each of the plurality of fields of view stored as a camera marker for that particular field of view that identifies a particular video data stream of the plurality of video data streams;
the mobile device subsequently capturing an image of a field of view of one of the plurality of video data streams displayed on the monitoring station;
matching the field of view of the subsequently captured image with a source of the video data stream using the static database of camera markers; and
responsive to matching the field of view of the subsequently captured image with the source of the video data stream, displaying the video data stream on the mobile device.

13. The method of claim 12 wherein each of the plurality of fields of view are unique.

14. The method of claim 12 wherein matching the field of view with the source includes comparing the field of view of the subsequently captured image with the static database of camera markers, matching the field of view of the subsequently captured image with one of the plurality of camera markers, and matching the one of the plurality of camera markers with the source.

15. The method of claim 12 further comprising:
using the camera of the mobile device to capture a QR code;
matching the QR code with a particular remote device; and
responsive to matching the QR code, causing the video data stream to be displayed on the particular remote device.

* * * * *